United States Patent
Berry et al.

(10) Patent No.: US 7,392,844 B2
(45) Date of Patent: *Jul. 1, 2008

(54) METHOD OF TREATING AN OIL OR GAS WELL WITH BIODEGRADABLE LOW TOXICITY FLUID SYSTEM

(75) Inventors: Sandra L. Berry, Tomball, TX (US); Kay E. Cawiezel, Fulshear, TX (US)

(73) Assignee: BJ Services Company, Houston, TX (US)

( * ) Notice: Subject to any disclaimer, the term of this patent is extended or adjusted under 35 U.S.C. 154(b) by 254 days.

This patent is subject to a terminal disclaimer.

(21) Appl. No.: 11/263,848

(22) Filed: Nov. 2, 2005

(65) Prior Publication Data

US 2006/0096758 A1    May 11, 2006

Related U.S. Application Data

(63) Continuation-in-part of application No. 10/985,458, filed on Nov. 10, 2004, now Pat. No. 7,231,976.

(51) Int. Cl.
*E21B 33/16* (2006.01)
*E21B 37/00* (2006.01)
*E21B 43/22* (2006.01)
*E21B 43/26* (2006.01)

(52) U.S. Cl. ............... 166/291; 166/304; 166/308.3; 166/308.4; 166/312; 507/265; 507/267; 507/905; 507/928; 507/929

(58) Field of Classification Search ............ 166/291, 166/300, 304, 305.1, 308.2–308.4, 312, 371, 166/384; 507/265, 267, 905, 928, 929
See application file for complete search history.

(56) References Cited

U.S. PATENT DOCUMENTS

| 4,737,296 | A | * | 4/1988 | Watkins | 507/202 |
|---|---|---|---|---|---|
| 5,226,481 | A | | 7/1993 | Le et al. | |
| 5,421,907 | A | * | 6/1995 | Nieendick et al. | 134/40 |
| 5,950,729 | A | | 9/1999 | Dawson et al. | |
| 6,096,699 | A | * | 8/2000 | Bergemann et al. | 510/201 |
| 6,173,776 | B1 | | 1/2001 | Furman et al. | |
| 6,260,620 | B1 | | 7/2001 | Furman et al. | |
| 6,260,621 | B1 | | 7/2001 | Furman et al. | |
| 6,284,720 | B1 | * | 9/2001 | Opre | 510/170 |
| 6,620,772 | B2 | * | 9/2003 | Garmier | 508/491 |
| 6,630,428 | B1 | | 10/2003 | Furman et al. | |
| 6,719,053 | B2 | | 4/2004 | Thompson et al. | |
| 6,797,684 | B2 | | 9/2004 | Henneberry et al. | |
| 6,849,581 | B1 | | 2/2005 | Thompson et al. | |
| 6,978,836 | B2 | * | 12/2005 | Nguyen et al. | 166/295 |
| 7,017,665 | B2 | * | 3/2006 | Nguyen | 166/281 |
| 7,036,589 | B2 | | 5/2006 | Nguyen | |
| 7,040,403 | B2 | | 5/2006 | Nguyen et al. | |
| 7,185,699 | B2 | * | 3/2007 | Zazovsky et al. | 166/244.1 |
| 2002/0098997 | A1 | | 7/2002 | Audibert-Hayet et al. | |
| 2003/0166472 | A1 | | 9/2003 | Pursley et al. | |
| 2003/0188864 | A1 | | 10/2003 | Boudreau | |
| 2004/0224854 | A1 | | 11/2004 | Boudreau | |
| 2005/0059555 | A1 | * | 3/2005 | Dusterhoft et al. | 507/100 |
| 2006/0035793 | A1 | * | 2/2006 | Goldman | 508/433 |
| 2006/0090895 | A1 | * | 5/2006 | Chatterji et al. | 166/278 |
| 2007/0225174 | A1 | * | 9/2007 | Berry et al. | 507/203 |

FOREIGN PATENT DOCUMENTS

WO    WO 97/12947        4/1997
WO    WO 02-062920 A1    8/2002

* cited by examiner

*Primary Examiner*—George Suchfield
(74) *Attorney, Agent, or Firm*—Jones & Smith, LLP; John Wilson Jones

(57) ABSTRACT

A method of treating a well consists of introducing into the wellbore a biodegradable fluid system containing a fatty acid ester, such as methyl soyate. The fluid system may further contain a lactic acid ester, such as ethyl lactate, and/or a nonionic surfactant. The fluid system may be used in displacement, well remediation and stimulation as well as additional, alternative applications such as the cleaning of surface and/or downhole equipment.

21 Claims, No Drawings

METHOD OF TREATING AN OIL OR GAS WELL WITH BIODEGRADABLE LOW TOXICITY FLUID SYSTEM

SPECIFICATION

This application is a continuation-in-part application of U.S. patent application Ser. No. 10/985,458, filed on Nov. 10, 2004 now U.S. Pat. No. 7,231,976.

FIELD OF THE INVENTION

The invention relates to a process of treating an oil or gas well having a wellbore with a biodegradable fluid system containing a fatty acid ester. The biodegradable fluid system may be in the form of a microemulsion.

BACKGROUND OF THE INVENTION

Stimulation refers to the treatment of geological formations to improve the recovery of hydrocarbons. Common stimulation techniques include well fracturing and acidizing operations.

Fracturing of the formation is accomplished by pumping fluids into the borehole of an oil or gas well under high pressure to create fractures in the rock formation surrounding the wellbore. The fractures radiate outwardly from the wellbore, typically from a few to hundreds of meters, and extend the surface area from which oil or gas drains into the well.

Typically, the fracturing fluid is a crosslinked polymer that has been gelled to increase its viscosity. Crosslinked gels are able to withstand the high temperature conditions commonly found in deeper oil and gas wells with little reduction in viscosity. After the fracturing fluid is injected into the formation to produce the fracture, the viscosity of the fluid is reduced by gel breakers. Such components break down the gelled fluid so that it can be easily pumped and removed from the well. Often, breaker catalysts are used to activate the gel breaker.

In certain formations, aqueous acid solutions can be used to improve the permeability of the formation, thereby increasing production. These acids are often combined with the polymer gels used in fracturing to provide an acid fracturing fluid. One of the benefits of combining the aqueous acid solutions with gelled fracturing fluids is that the gelled fluid inhibits or retards the reaction of the acid with the formation. This is beneficial in that the acid would otherwise react too quickly, depleting the acid with very little penetration of the formation. Once in place, the viscosity of the fluid is reduced so that the acid is released to react with formation damage or other skin present at the face of the newly formed fractures and improving the permeability of the producing strata.

In addition to fracturing and acidizing operations, stimulation further encompasses techniques for enhancing oil recovery as well as water control treatments. In the latter, the flow of excess water is prevented while the flow of produced hydrocarbons from the well is enhanced. For instance, U.S. Pat. No. 5,228,812 and U.S. Patent Application No. US2004/0177957A1 discloses a chemical treatment that selectively reduces water production by the use of relative permeability modifiers (RPMs). RPMs are generally water soluble polymers having a charged end which assists in binding of the RPM to the geological rock formation.

Stimulation methods often include the use of spearhead fluids that are typically composed of an aqueous base fluid and chemical additives. Spearhead fluids precede the introduction of stimulation fluids. Spearhead fluids, for instance, may precede the introduction of RPMs. The spearhead fluid thereby removes heavy oil deposits in the near wellbore and oil films in the pore spaces of the rock. The RPM is then introduced and is capable of more strongly adhering to the rock.

In contrast to stimulation, remediation refers to the removal of unwanted deposits from the wellbore and production equipment. Remediation includes hydrogen sulfide mitigation. Such unwanted deposits form and/or accumulate in the wellbore, production and recovery equipment and well casing. For example, highly toxic hydrogen sulfide is produced during the decomposition of organic matter. In addition to hydrogen sulfide, other undesirable downhole products form such as scale, paraffins, fines, pipe dope, sulfur, heavy oil tar by-products and water blocks. Such accumulated deposits affect productivity and are typically removed prior to cementing or the introduction of completion fluids into the wellbore. Remediation treatment fluids are further typically used to remove such undesired deposits prior to the introduction of stimulation fluids.

Upon the completion of drilling and cementing operations, it is often desired to displace the drilling fluid system with a completion fluid system. Completion often requires the use of a packer fluid in the annulus between the casing and the production tubing. Well completion designs and reservoir conditions govern acceptable levels of particle content in packer fluids. The required cleanliness of this fluid can vary from several hundred Nephelometric Turbidity Units (NTU) down to 10-20 NTU.

Displacement of a drilling fluid with a completion fluid may be performed in several steps. Typically, the drilling fluid is first displaced by a casing cleaning fluid. Treatment with seawater normally follows. The seawater may then be displaced by a packer fluid. Complete displacement of a fluid by another fluid by use of hydraulic force is difficult to achieve in the annulus. In order to more efficiently displace the drilling fluid with a packer fluid, cleaning fluids with a variety of chemical additives are pumped between the drilling fluid and the packer fluid. The chemical additives serve to disperse and break-up solid components within the drilling fluid. In addition, they serve to decrease surface activity between the two fluids.

Well treatment fluids presently used for stimulation and remediation as well as fluids for removing drilling muds from the wellbore, prior to cementing or introduction of a completion brine, are either not biodegradable or are less efficacious than desired. There is a continued need for more effective methods and systems for drilling fluid displacement, enhancement of oil recovery, wellbore remediation and formation stimulation. In particular, there is a need for new systems that are biodegradable.

SUMMARY OF THE INVENTION

Improved efficiency in well remediation and stimulation is evidenced by the introduction of a biodegradable fluid system into the wellbore. The fluid system has applicability in the removal of pipe dope and hydrocarbons, oil based, and synthetic oil based drilling muds and the dispersement of paraffins and asphaltenes. It may further be used as a displacement spacer system, either as a single spacer or as a multiple spacer in conjunction with a second fluid, for the removal of oil/synthetic oil based mud cake and hydrocarbons prior to cementing or prior to introduction of a completion brine.

In addition, the fluid system of the invention is useful as a spearhead fluid for the removal of unwanted deposits or hydrocarbons prior to the introduction of a stimulation (or other well treatment) fluid.

Further, the fluid system for use in the invention is of assistance in water control and as a breaker catalyst to decrease the viscosity of fracturing fluids and other gelled well treatment fluids upon lowering of the pH. Alternatively, the fluid system may function with enzyme breakers. As the pH of the fluid system is decreased, the enzymes are activated which causes a decrease in viscosity of the fracturing fluids or other gelled well treatment fluids.

The biodegradable fluid system is further useful in the displacement of synthetic and oil based drilling mud systems from the annulus and casing.

The fluid system contains a fatty acid ester. The preferred fatty acid ester is a $C_1$-$C_4$ alkyl ester of a $C_{16}$-$C_{20}$ fatty acid such as an ester of oleic or linoleic acids. In a preferred embodiment, the fatty acid ester is methyl soyate.

The fluid system may further contain a lactate ester and/or a surfactant. The lactic acid ester is preferably a $C_1$-$C_4$ ester of lactic acid, such as ethyl lactate. The surfactant is preferably a nonionic surfactant.

The fluid system may contain an emulsifying agent. The emulsifying agent is typically anionic, non-ionic, or amphoteric.

The fluid system may further consist of an oil-in-water microemulsion which may, optionally, contain an alcohol.

DETAILED DESCRIPTION OF THE PREFERRED EMBODIMENTS

The fluid system used in the invention displaces synthetic and oil based drilling mud systems from the annulus and casing as well as increases the production of hydrocarbons from oil and gas wells by managing undesirable downhole products encountered during the production of hydrocarbons from such reservoirs. The fluid systems of the invention exhibit high flash points, generally in excess of 145° C. In addition, the fluid systems of the invention have low volatile organic compounds (VOCs) and exhibit very low aquatic toxicity. Thus, the fluid systems of the invention are especially useful in environmentally sensitive areas as well as in areas where a high flash point is necessary.

The system contains a fatty acid ester. It may further be combined with one or more emulsifiers and water to form a stabilized oil-in-water microemulsion. The microemulsion exhibits stability at high temperatures. For instance, a clear stable microemulsion with a 30 volume percent loading of the fluid system has been demonstrated to be stable at 82° C. and to 4° C. for a period of four hours.

Suitable fatty acid esters are those $C_1$-$C_4$ esters of $C_{16}$-$C_{20}$ fatty acids including edible vegetable oils. Such oils may have a melting point of −10° C. or less. Preferred edible vegetable oils are selected from the group consisting of corn, coconut, mustard, palm kernel oil, neem, niger seed, olive, peanut, poppy seed, safflower, rapeseed, sesame, soybean, sunflower seed, wheat germ oil and other polyunsaturated containing oils (such as oleic acid, linoleic acid, erucic acid and linolenic acid).

The $C_{16}$-$C_{20}$ fatty acid ester may further be a mixture of oils. Edible vegetable oils containing a mixture of about 70 to about 90 weight percent oleic and linoleic acids are often preferred. Soybean oil, which is comprised principally of oleic and linoleic acids, is a preferred $C_{16}$-$C_{20}$ fatty acid. A methyl ester is the preferred $C_1$-$C_4$ group. A particularly fatty acid ester is soybean methyl ester or soy methyl ester. Soy methyl ester is obtained from the esterification of soybean oil. Such fatty acid esters are non-toxic and biodegradable.

The fatty acid ester may further be combined with a lactate ester. The resulting blend may be used in conjunction with a co-solvent blend. The lactic acid ester is preferably a $C_1$-$C_4$ ester of lactic acid. Exemplary $C_1$-$C_4$ alcohols for producing the lactic acid ester include methanol, ethanol, propanol, isopropanol, allyl alcohol, butanol, 3-buten-1-ol, t-butanol and sec-butanol. (Such alcohols are further the preferred alcohols for producing the fatty acid esters.) In a particularly preferred embodiment, the lactic acid ester is ethyl lactate. Ethyl lactate is the ester of natural lactic acid produced by fermentation of corn-derived feedstock. Like the fatty acid esters, lactic acid esters are 100% biodegradable, breaking down into carbon dioxide and water, non-toxic, and renewable.

When present, the lactic acid ester is present at about 20 to about 75 weight percent and the fatty acid ester at about 10 to about 80 weight percent of the blend. In still other embodiments, the two co-solvents are each present at about 40 to about 60 weight percent of the composition. In a preferred embodiment, the weight ratio of lactic acid ester:fatty acid ester is between from about 35:65 to 65:35, preferably 50:50.

The fatty acid ester may further be combined with a surfactant. The resulting fluid may further contain the lactic acid ester set forth above. In a preferred embodiment, the surfactant is nonionic. Nonionic surfactants with HLB between from 1 to about 30 are preferred, most preferably those having a HLB between from about 10 to about 20. Preferred nonionic surfactants include oxyalkylated alkyl phenols such as octylphenol polyethylene oxide ethers and nonylphenol polyethylene oxide ethers as well as linear alcohol polyethylene oxide ethers and sorbitan monooleate polyethylene oxide ethers. Such nonionic surfactants include those sold under the commercial name of TERGITOL, TRITON, BRIJ and MAKON. When present, the weight percent of the nonionic surfactant based on the total weight of $C_1$-$C_4$ ester of a $C_{16}$-$C_{20}$ fatty acid and surfactant is between from about 1 to about 8 percent.

The fluid system may further contain thixotropic agents and pH adjusters, when needed. For instance, the fluid systems may contain between 0 to about 10 weight percent of thickener. Preferred thixotropic agents are polysaccharide derivatives having nonionic functionalities such as alkyl alcohol or ether groups. Exemplary thickeners include methylcellulose, hydroxyethyl cellulose, hydroxypropyl cellulose, hydroxypropyl methylcellulose, cornstarch, hydroxyethyl cornstarch, and hydroxypropyl cornstarch.

The fluid system may be a homogeneous liquid or gel at 0° C. It may further have a flash point in excess of 60° C., preferably in excess of 66° C.

The fluid system can also be used as a concentrate, and as such, it can be admixed with up to about 30 weight percent water prior to use. The fluid system may further be emulsified prior to use.

In particular, the fluid system used in the invention may be in the form of a microemulsion, defined as a multiphase system consisting of water, co-solvent blend, emulsifier(s), and alcohol, and is a transparent and thermodynamically stable liquid solution. Microemulsions can be considered as small-scale versions of emulsions, i.e., droplet type dispersions either of oil-in-water with an average particulate size ranges in the order of about 5 to about 50 nm in drop radius. In emulsions, the average drop size grows continuously with time so that phase separation ultimately occurs. The drops of the emulsion are generally large (>0.1 microns) and often exhibit a milky or cloudy, rather than a translucent, appearance as seen in microemulsions.

The emulsifying agent lowers the interfacial tension between oil and water to produce a sufficiently small droplet size, from about 3 microns to about 20 microns, preferably about 10 microns or less in diameter. The emulsifier should be capable of creating an oil-in-water microemulsion upon combination with an appropriate quantity of water. Preferred emulsifiers are biodegradable and have an HLB (hydrophile-lipophile balance) value between from about 8 to about 18.

When employed, such emulsifiers may be present in the produced emulsion at a concentration in the range of about 200 ppm to about 10,000 ppm.

The emulsifiers can be anionic, nonionic, amphoteric, as well as mixtures thereof. Blends of both non-ionic and anionic emulsifiers have been found to decrease droplet size in most instances. Where such a blend is used, a preferred ratio of non-ionic to anionic emulsifier is about 5/95 to about 95/5, preferably about 50/50 to about 85/15.

Any suitable, non-toxic anionic emulsifier may be used in such blends. Preferred anionic emulsifiers include, but are not necessarily limited to those selected from the group consisting of alkyl sulfates, alkane sulfonates, alkyl aryl sulfonates and phosphate esters comprising about 8 to about 18 carbon atoms, preferably about 8 to about 12 carbon atoms.

Suitable anionic emulsifiers include the sodium alkyl benzene sulfonates sulfosuccinic acid esters such as sodium dioctyl sulfosuccinate, and the like. Preferred is dioctyl sulfosuccinate having an HLB value greater than about 13.

Suitable non-ionic emulsifiers are those based on fatty alcohols. For instance, a preferred non-ionic emulsifier is of the fatty alcohol ethoxylate type such as one having 6-mole ethoxylation on a 12-carbon alcohol. An example of a particularly suitable fatty alcohol ethoxylate is tallow alcohol ethoxylate containing 2 or 3 moles of ethylene oxide.

Further suitable as the nonionic emulsifiers are alkyl and alkylaryl polyether alcohols such as linear or branched polyoxyethylene alcohols, more preferably linear polyoxyethylene alcohols, comprising (a) from about 8 to about 30, preferably about 8 to about 20, carbon atoms, and (b) comprising about 3 to about 50 moles, most preferably about 3 to about 20 moles, ethylene oxide. Most preferred non-ionic emulsifiers are linear polyoxyethylene alcohols having from about 13 to about 15 carbon atoms and comprising about 10 moles ethylene oxide. Further, preferred emulsifiers include nonylphenol ethoxylate having a HLB value of about 16 and comprising 20 ethylene oxide units per molecule, octylphenol ethoxylate having an HLB value greater than 13.5, and nonylphenol ethoxylate having a HLB value greater than 13.

In another preferred embodiment, the non-ionic emulsifiers are a combination of alkylaryl ethoxylate and a polyethylene glycol (PEG) ester of fatty acids. Preferably, the alkylaryl ethoxylate is octyl, nonyl or dodecylphenol with 3 to 13 moles of ethylene oxide, while the PEG ester is of molecular weight range 200-600 with either one or two moles of unsaturated fatty acids.

Further preferred as oil-in-water emulsifiers are polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, dioxane, ethylene glycol and ethoxylated castor oils such as polyethylene glycol castor oil, dipalmitoylphosphatidylcholine (DPPC), polyoxyethylene (8.6) nonyl phenyl ether, ethylene oxide sulfonates (i.e., alkyl propoxy-ethoxysulfonate), alkyl propoxy-ethoxysulfate, alkylarylpropoxyethoxysulfonate and highly substituted benzene sulfonates.

Illustrative amphoteric emulsifiers suitable for present purposes are polyethoxyline amine and oxyethylated sodium salts.

While it is acknowledged that the emulsifiers outlined above cover a wide range of physical properties and provide wide ranging emulsification abilities, a balance between two quite different emulsifiers can produce a far greater effect than an intermediate emulsifier. For instance, especially desired results are obtained by use of a fatty alcohol and dioctyl sodium sulfosuccinate.

The microemulsions may further contain a sufficient amount of a relatively strong acid to lower the pH of the fluid system to about 4 or less, preferably to about 2 or less to about 3 or less, and most preferably to about 1 or less. Relatively strong acids include, but are not necessarily limited to, phosphoric acid, hydrochloric acid, sulfuric acid, nitric acid, and the like. A preferred acid is phosphoric acid.

The alcohol component of the microemulsion serves as a coupling agent between the co-solvent blend and the emulsifier, thereby stabilizing the microemulsion. The alcohol also lowers the freezing point of the well treatment microemulsion. Although isopropanol is presently preferred, alternative suitable alcohols include mid-range primary, secondary and tertiary alcohols with between 1 and 20 carbon atoms, such as t-butanol, n-butanol, n-pentanol, n-hexanol and 2-ethyl-hexanol. Other freeze prevention additives can additionally or alternatively be added, such as detergent range alcohols ethoxylate, ethylene glycols (EG), polyethylene glycols (PEG), propylene glycols (PG) and triethylene glycols (TEG), with triethylene glycol being presently preferred.

The microemulsion preferably comprises from 0 wt % to about 15 wt % strong acid; about 10 wt % to about 70 wt %, preferably about 65 wt % emulsifier(s); from about 10 to about 50 wt % of lactate ester/fatty acid ester blend; from about 25 to about 45 wt. % alcohol and, the remainder, water. The microemulsion may further optionally include a salt.

The addition of a salt to the fluid system reduces the amount of water needed and also lowers the freezing point of the well treatment microemulsion. Among the salts that may be added are NaCl, KCl, $CaCl_2$, and MgCl. Others suitable salts can be formed from K, Na, Br, Cr, Cs and Bi metals.

The microemulsions may be prepared by subjecting the emulsifier(s), alcohol and optional components to high intensity shear at room temperature, typically for about 5 to 10 minutes. The blend of lactic acid ester and fatty acid ester is then added and shearing is continued. Water is then added, typically after about 5 to 10 minutes. The resulting microemulsion is typically colorless.

Furthermore, it will be understood that in some applications, it may be desirable to introduce the blend of lactic acid ester and fatty acid ester blend downhole where it will be combined with separately injected water and water-based materials, such as emulsifier(s) and alcohol, to form the microemulsion in situ.

In well remediation applications, the fluid system is preferably injected directly into the wellbore through the production tubing or through the use of coiled tubing or similar delivery mechanisms. Once downhole, the well treatment fluid system remedies damage caused during well treating such as, for instance, by stimulation fluids and drilling fluid muds, by dispersing and removing fines, paraffin and/or asphaltene deposits, sulfur, pipe dope and unwanted hydrocarbons, such as heavy oil tar by-products and water blocks, from the formation and wellbore.

The fluid system can further be used for hydrogen sulfide mitigation. In a preferred embodiment, the fluid system is injected into the wellbore so that escaping hydrogen sulfide gas is "stripped" through the system. Preferably, the fluid system is periodically injected into problem wells to mitigate hydrogen sulfide production. Alternatively, the fluid system may be injected downhole via capillary tubing on a continuous basis. In yet another alternate embodiment, the fluid system may be placed in a container that is placed in fluid communication with the hydrogen sulfide. The interaction between the fluid system and the hydrogen sulfide neutralizes the enhancement of oil recovery and is useful in hydrogen sulfide, leaving an inert sulfur compound as a product of the reaction. Some or all of the water in the fluid system may further be replaced with a known hydrogen sulfide scavenger. For example, many cyclic amines, such as triazines and hexamines, can be used in combination with water to further improve hydrogen sulfide mitigation.

The well treatment fluid system can also be used in stimulation operations. In fracturing operations, for example, proppant material can be added to the system before injection downhole. The well treatment fluid system can also be used to deliver acids during acidizing operations. Acids commonly used include hydrochloric, acetic, formic, and hydrochloric-hydrofluoric acids.

When a microemulsion is desired, the co-solvent blend and emulsifying agent and alcohol may be combined with an acidified carrier fluid to prepare a microemulsion suitable for acidizing operations. Such microemulsions include about 0.2%-15% by volume of the blend and about 3%-28% by volume of acid. In a particularly preferred embodiment, the microemulsion includes about 0.2%-15% of the blend and about 15% by volume of hydrochloric acid. The concentration of the well treatment microemulsion in gelled fluids lowers the friction created by contact with conduits, thereby facilitating the injection and withdrawal of the well treatment microemulsion.

The fluid system of the invention is useful in the enhancement of oil recovery and has applicability as a spearhead fluid and thus may be introduced prior to the introduction of a well treatment fluid. For instance, the fluid system is useful as a spearhead fluid to remove produced hydrocarbons prior to a water control treatment. This treatment further serves to prevent breakage or emulsification of the subsequently injected water control fluid due to mixing with the produced oil.

The system is further efficacious in the alleviation of water blocks, the removal of excess water and the lowering of pore pressure in the formation.

The fluid system used in the invention is suitable for the reduction of the viscosity of any well treating gelled fluid. For instance, the well treatment fluid system is useful as a breaker catalyst for highly viscous crosslinked gels to lower viscosity fluids by lowering the pH of the system. This occurs by the conversion of the lactic acid ester to lactic acid that, in turn, lowers the pH. The lowering of the pH serves to reduce the viscosity of the gelled fluid by reversing the crosslinking of the fracturing fluids. Desired materials, such as oil and gas, thereafter more easily flow into the wellbore.

In addition, where an enzyme breaker is used, the use of the fluid system of the invention causes a decrease in pH over time. As the pH is decreased, the enzymes are activated. Upon activation, the enzymes function to break the gel. Thus, the solvent system may be utilized to activate gel breakers, such as enzymes, to reduce the viscosity of a fracturing fluid or gelled fluid system.

In a preferred mode, the fluid system is used to displace the drilling fluid with the completion fluid by being pumped into the well prior to introduction of packer fluid, when used. The fluid system has particular applicability in the removal of synthetic based oil muds (SOBM) and oil based drilling muds (OBM) from the wellbore casing, tubing and downhole liners in light of its ability to more readily break down emulsifiers and other additives present in the mud. In a particularly preferred embodiment of the invention, the fluid system is a microemulsion used to remove OBM/SOBM drilling mud fluids. When used as a microemulsion, the emulsifier should be selected according to whether oil or water based drilling fluids is used.

The system is further effective at decreasing the density of filter cakes during high pressure injection of gelled fluids into the wellbore.

The fluid system may also be used for other applications such as to clean surface and downhole equipment.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims that follow.

EXAMPLES

In the Examples, the following components were used:

SoyGold 1000, a product of AG Environmental, containing soybean methyl ester and having a flash point in excess of 150° C., a VOC of 7.29% (64 g/l), and a boiling point of 333° C.;

SoyGold 2000, a product of AG Environmental, containing soybean methyl ester and 3 weight percent surfactant and having a flash point in excess of 150° C., VOC of 4.3 g/l; and a boiling point of 334° C.;

VertecBio Gold #1, product of Vertec Gold, containing 50 volume percent ethyl lactate and 50 volume percent soybean methyl ester and having a flash point of 65.6° C., a VOC of 604 g/l and a boiling point of 144.4° C.;

Paravan 25, a terpene-based solvent, commercially available from BJ Services Company;

Synperonic 91/6 is a fatty alcohol ethoxylate, commercially available from Uniqema;

Monawet MO-70R is composed of dioctyl sodium sulfosuccinate and propylene glycol, commercially available from Uniqema;

Monawet MM-80 is composed of a sulphosuccinate, commercially available from Uniqema;

Nova Plus is a drilling fluid mud of M-I Swaco;

EOG is drilling fluid mud of Enron Oil & Gas; and

Synteq is a drilling fluid mud of Baker Hughes Inteq.

All percentages are weight percent unless otherwise noted.

Examples 1-4

Pipe dope removal efficiency studies were conducted with four different pipe dope materials. A Chan 35 viscometer rotor sleeve and ring were weighed clean, W1. Each of the test pipe dope materials were coated onto the pre-weighed Chan 35 viscometer sleeve and the weight of the sleeve and pipe dope were recorded, W2. The sleeve was placed back onto the viscometer without the interior bob. The test fluid system (SoyGold 2000 and VertecBio Gold #1) were heated to 140° F. The heater cup was then placed separately around the Chan 35 pipe dope coated sleeve until the fluid reached the marked fluid line.

After the fluid level was reached, the Chan 35 was turned on for 20 minutes at the 200 rpm setting. After the twenty minute reaction period, the Chan 35 was turned off, the heater cup lowered and the Chan 35 sleeve was allowed to drain for two minutes. After the two-minute drain period, the sleeve was removed from the viscometer and weighed, W3. The percent pipe dope removal efficiency was calculated by the following formula:

$$(W2-W3)/(W2-W1) \times 100.$$

Results of the pipe dope removal tests are summarized in Table 1 below.

TABLE I

Pipe Dope Removal Efficiency Studies at 140° F. for 20 Minutes

| Example No. | Pipe Dope | SoyGold 2000 | VertecBio Gold #1 | Paravan 25 |
|---|---|---|---|---|
| 1 | API Modified High Pressure High Temperature Thread | 72.1% | 90% | 92% |
| 2 | 326 OCR Modified | 68% | 91% | 84% |
| 3 | Eco Lubeseal Thread Compound | 97% | 96% | 95% |
| 4 | Bestolife 2000 | 89% | 97% | 95% |

VertecBio Gold #1 and SoyGold 2000 were as efficient as Paravan 25 in the removal of pipe dope from the Chan 35 sleeve. VertecBio Gold #1 was shown to be more efficient than the Paravan 25 solvent and the SoyGold 2000 system in removing the four test pipe dope materials.

Examples 5-12

Chan 35 tests were conducted to determine mud removal efficiency from a metal surface and the cleaning efficiencies of two bio-based fluid systems in comparison to Paravan 25 solvent system. The studies were conducted with seven oil based and synthetic oil based drilling muds and one thick produced oil sample at temperatures of 70° F. and 150° F.

The Chan 35 tests procedure involved: (1) weighing the Chan 35 rotor without the "bob" to determine the initial weight of the clean rotor, W1; (2) mixing each of the mud systems for 30 minutes and transferring a uniform sample to a Fann cup; and, if required, (3) heating both the test mud/hydrocarbon and the test solvent to 180° F. for a period of 20 minutes; (4) raising the Fann cup with the well mixed mud/hydrocarbon sample to the scribed line on the rotor and allowing the samples to stand under static conditions for 10 minutes; (5) lowering the mud from the rotor and allowing it to drip for two minutes; (6) wiping the bottom surface of the rotor clean and weighing the ring and rotor with a uniform mud coating upside down on a balance and then recording the weight, W2; (7) replacing the rotor on the Chan 35 and placing the rotor covered with a uniform layer of mud/oil sample in a test cup containing the test solvent at the desired test temperature; (8) rotating the rotor at 200 rpm for 10 minutes and then removing it from the test solution; (9) allowing the rotor to drip for two minutes and wiping the bottom to remove any drops without removing the test mud or remaining hydrocarbon; (10) removing the rotor from the Chan 35 and weighing it upside down, W3; (11) repeating the process until W3 values at 20 and 30 minutes have been obtained; (12) calculating the % mud removal using the W1, W2, and W3 values.

The % removal efficiencies (RE %) of the test solvents at 70° F. and 150° F. were calculated by the following formula:

$$RE\% = (W2-W3)/(W2-W1) \times 100$$

The initial rheologies of the test muds samples and produced hydrocarbons utilized in the displacement spacer study were measured at room temperature as a key indicator to mud properties and overall condition for displacement. The rheology data of the mud samples, as recorded from the Chan 35 rheometer at 70° F., are set forth in Table II below.

TABLE II

Chan 35 Rheology Data On The Test Muds/Hydrocarbon Systems At 70° F.

| Example No. | 600/300 | 200/100 | 60/30 | 6/3 | Gel/10 min Gel |
|---|---|---|---|---|---|
| 5 | 12.5 ppg Nova Plus SOBM | | | | |
|   | 64/34 | 24/12 | 12/7 | 2/1 | 1/1 |
| 6 | 14.0 ppg Nova Plus SOBM | | | | |
|   | 48/28 | 19/12 | 8/7 | 3/2 | 3/5 |
| 7 | 14.0 ppg Synteq OBM | | | | |
|   | 67/36 | 24/14 | 9/6 | 4/3 | 3/6 |
| 8 | 17.0 ppg Synteq OBM | | | | |
|   | >320/217 | 152/79 | 50/27 | 8/5 | 8/17 |
| 9 | 15.3 ppg EOG OBM | | | | |
|   | 217/123 | 62/33 | 27/20 | 8/5 | 6/8 |
| 10 | 15.0 ppg Exxon Mobil OBM | | | | |
|   | 115/66 | 47/25 | 17/10 | 4/3 | 5/12 |
| 11 | 15.3 ppg US Encorp | | | | |
|   | 178/95 | 66/37 | 25/15 | 7/5 | 9/13 |
| 12 | Exxon Mobil East Breaks Produced Oil | | | | |
|   | 122/63 | 43/22 | 12/7 | 2/1 | 1/1 |

Table III and Table IV detail the results of the displacement studies conducted with the three displacement solvent systems at 70° F. and 150° F.

TABLE III

Oil Based and Synthetic Oil Based Drilling Mud Removal Efficiencies (% MRE) At Room Temperature

| Ex. No. | Drilling Mud System | SoyGold 1000 | SoyGold 2000 | VertecBio Gold #1 | Paravan 25 |
|---|---|---|---|---|---|
| 5 | 12.5 ppg Nova Plus | — | 10 min - 85% | 10 min - 89% | 10 min - 90% |
| 6 | 14.0 ppg Nova Plus | 10 min - 65% | 10 min - 95% | 10 min - 96% | 10 min - 95% |
| 7 | 14.0 ppg Synteq | 10 min - 75% | 10 min - 90% | 10 min - 97% | 10 min - 90% |
| 8 | 17.0 ppg Synteq | — | 10 min - 1.18% | 10 min - 81% | 10 min - 82% |
|   |   |   | 20 min - 3.1% | 20 min - 93% | 20 min - 88% |
|   |   |   | 30 min - 7.1% |   |   |
| 9 | 15.3 ppg EOG | — | 10 min - 86% | 10 min - 25% | 10 min - 91% |
|   |   |   | 20 min - 93% | 20 min - 34% |   |
|   |   |   |   | 30 min - 38% |   |
|   |   |   |   | 40 min - 40% |   |
| 10 | 15.0 ppg ExxonMobil | — | 10 min - 20% | 10 min - 96% | 10 min - 90% |
|   |   |   | 20 min - 32% |   |   |
|   |   |   | 30 min - 46% |   |   |
|   |   |   | 40 min - 50% |   |   |

TABLE III-continued

Oil Based and Synthetic Oil Based Drilling Mud Removal Efficiencies (% MRE)
At Room Temperature

| Ex. No. | Drilling Mud System | SoyGold 1000 | SoyGold 2000 | VertecBio Gold #1 | Paravan 25 |
|---|---|---|---|---|---|
| 11 | 15.3 ppg US Encorp | — | 10 min - 16%<br>20 min - 21% | 10 min - 81%<br>20 min - 83%<br>25 min - 98% | 10 min - 91% |
| 12 | Exxon Mobil East Break Produced Oil | — | 10 min - 90% | 10 min - 90% | 10 min - 90% |

TABLE IV

Oil Based and Synthetic Oil Based Drilling Mud Removal Efficiencies (% MRE) at 150° F.

| Example No. | Drilling Mud System | SoyGold 2000 | VertecBio Gold #1 | Paravan 25 |
|---|---|---|---|---|
| 5 | 12.5 ppg Nova Plus SOBM | 10 min - 91% | 10 min - 91% | 10 min - 82% |
| 6 | 14.0 ppg Nova Plus SOBM | 10 min - 71<br>20 min - 79% | 10 min - 93% | 10 min - 93% |
| 7 | 14.0 ppg Synteq | 10 min - 87% | 10 min - 100% | 10 min - 74% |
| 8 | 17.0 ppg Synteq | 10 min - 10.8%<br>20 min - 17.6%<br>30 min - 23.4% | 10 min - 90% | 10 min - 91% |
| 9 | 15.3 ppg EOG | 10 min - 86% | 10 min - 85%<br>20 min - 94% | 10 min - 88% |
| 10 | 15.0 ppg ExxonMobil | 10 min - 18%<br>20 min - 43% | 10 min - 91% | 10 min - 88%<br>20 min - 90% |
| 11 | 15.3 ppg US Encorp Produced Oil | 10 min - 50%<br>20 min - 84% | 10 min - 88%<br>20 min - 93% | 10 min - 91% |
| 12 | Exxon Mobil East Break Produced Oil | 10 min - 90% | 10 min - 90% | 10 min - 90% |

VertecBio Gold #1 was as efficient in mud removal at room temperature and 150° F. as the Paravan 25 solvent. The % MRE data shows the VerterBio Gold #1 was much more efficient in mud removal at room temperature and 150° F. than the SoyGold 2000 system. The removal efficiency from the Chan 35 rotor sleeve at 70° F. was from 85% to 95%. The removal efficiency at 180° F. was from 88% to 97%. The fluid system can be used as a displacement spacer system, either as a single spacer or as a multiple spacer in connection with a second fluid, to effectively remove oil/synthetic oil based mud cake and hydrocarbons from a wellbore prior to cementing or prior to introduction of completion brine during completion operations.

Example 13

VertecBio Gold #1 and SoyGold 2000 fluid systems were tested to determine the ability to dissolve or disperse paraffin and asphaltene deposits in comparison to xylene and Paravan 25.

Paraffin or asphaltene solid (0.5 grams) was added to a container with a 50 cc volume of fluid system. The container was then covered and incubated in a 175° F. water bath for a period of 45 minutes. After the 45 minute incubation period, the jars were removed from the water bath and the fluid system was filtered through a Whatman filter to collect the remaining solids. After the total fluid volume was filtered, the remaining solids were washed with water and dried at 120° F. The remaining solid weight from each test was determined and the weights were utilized to calculate the percent solids dissolved. Table V details the results of the paraffin and asphaltene dissolution tests conducted with the VertecBio Gold #1 and the SoyGold 2000 in comparison to xylene and Paravan 25 solvents.

TABLE V

Paraffin and Asphaltene Dissolution Tests at 175° F. for 45 Minutes

| Solid | Solvent System | Weight % Dissolved |
|---|---|---|
| Asphaltene | Xylene | 94% |
| Asphaltene | Paravan 25 | 92% |
| Asphaltene | SoyGold 2000 | 92% |
| Asphaltene | VertecBio Gold #1 | 94% |
| Paraffin | Xylene | 44% |
| Paraffin | Paravan 25 | 46% |
| Paraffin | SoyGold 2000 | 24% |
| Paraffin | VertecBio Gold #1 | 30% |

VertecBio Gold #1 dissolved the test asphaltene solids as effectively as xylene and slightly more efficiently than the Paravan 25. In the paraffin solids dispersion tests, VertecBio Gold #1 dissolved a lower percentage of paraffins than the xylene or Paravan 25 solvent system. However, it was active on the paraffin material.

Thus, VertecBio Gold #1 was very effective in removal of pipe dope, as a displacement cleaning spacer for OB and SOBM muds, and in dissolution/dispersion of paraffin solids as a neat solvent. The VertecBio Gold #1 was more efficient in these applications than the SoyGold 2000 alone.

The bio-based system fluids are 100% biodegradable to carbon dioxide and water have low volatile organic compounds (VOCs) and have low aquatic toxicity. They are useful in environmentally sensitive areas especially when used to remove and disperse or dissolve asphaltenes and paraffins from producing oil and gas wells.

Examples 14-17

A microemulsion product containing the water-insoluble VerticBio Gold #1 illustrates reduction in costs of the treatment spacer system. The microemulsion was prepared containing 50% ethyl lactate and 50% soybean methyl ester solvent. The blend was then mixed with an emulsifier blend of Synperonic 91/6 and Monawet MO-70R. Synperonic 91/6 was mixed with the Monawet MO-70R at volume ratios of 40/60, 50/50 or 60/40. This emulsifier was then mixed at a ratio of 25 volume % with solvent and water at ratios of approximately 30% and 45% for the total microemulsion package system.

The following formulas were blended in a Waring blender at the high shear setting with a ten-minute mixing period after the addition of each component. After the addition of the last component (water), the final composition was mixed for an additional ten minutes to ensure adequate high energy mixing for the formation of a microemulsion. After mixing, the solution were poured into a glass jar and allowed to sit overnight. The solutions were then evaluated for stability and clarity to determine if a microemulsion had been mixed.

Example 14

1000 cc Total Volume

| | |
|---|---|
| A) 125 cc of Synperonic 91/6<br>125 cc of Monawet MO-70R | 25% Total Volume |
| B) 150 cc of Ethyl Lactate<br>150 cc Soybean Methyl Ester<br>(The two solvents were mixed initially and added as one solvent system.) | 30% Total Volume |
| C) 450 cc of Water | 45% Total Volume |

Example 15

1000cc Total Volume

| | |
|---|---|
| A) 125 cc of Synperonic 91/6<br>125 cc of Monawet MM-80 | 25% Total Volume |
| B) 150 cc of Ethyl Lactate<br>150 cc of Soybean Methyl Ester<br>(The two solvents were mixed initially and added as a single solution.) | 30% Total Volume |
| C) 450 cc of water | 45% Total Volume |

Example 16

1000 cc Total Volume

| | |
|---|---|
| A) 100 cc of Synperonic 91/6<br>150 cc of Monawet MM-80 | 25% Total Volume |
| B) 150 cc of Ethyl Lactate<br>150 cc of Soybean Methyl Ester<br>(The two solvents were mixed initially and added as a single solution.) | 30% Total Volume |
| C) 450 cc of water | 45% Total Volume |

Example 17

1000 cc Total Volume

| | |
|---|---|
| A) 150 cc of Synperonic 91/6<br>100 cc of Monawet MM-80 | 25% Total Volume |
| B) 150 cc of Ethyl Lactate<br>150 cc of Soybean Methyl Ester<br>(The two solvents were mixed initially and added as a single solution.) | 30% Total Volume |
| C) 450 cc of Water | 45% Total Volume |

Formulation Stability Tests

Evaluation of the formulations of Examples 14-18 showed that formulations of Examples 15-18 were cloudy with a destabilized layer of emulsifier on top of the solutions. However, the formulation of Example 14 was clear with no component breakout evident. This solution remained clear and stable for a six-week room temperature incubation period.

Heat/Thaw Stability Tests

Heat and freeze stability tests were conducted on the formulation of Example 14 to determine if the microemulsion would destabilize with extreme temperatures. The formulation was cooled down to a temperature of 40° F. for a two hour period to check for fluid crystallization. No crystallization or freezing of the formulation was observed. The formulation of Example 14 was removed from the refrigerator and heated to 175° F. for a period of three hours to check for high temperature instability. No component breakout or instability was observed after incubation at 175° F. for three hours.

Mud Displacement Study

A mud displacement cleanup study was conducted with the microemulsion of Example 14 to determine how well it displaced the 17.0 ppg Synteq oil based mud from the sleeve of the Chan 35 viscometer. The displacement studies showed that at 140° F. after a ten minute reaction period at 200 rpm, the microemulsion formulation of Example 14 removed 89% of the 17.0 ppg Synteq oil based mud from the viscometer sleeve. This test showed the microemulsion of Example 14 performed as well or better than the pure solvent in removing the 17.0 ppg Synteq oil based mud from the Chan 35 sleeve under the same temperature, time and rpm conditions. The previous test results show the pure solvent under the same test conditions removed approximately 81% of the 17.0 ppg Synteq oil based mud from the Chan 35 sleeve.

From the foregoing, it will be observed that numerous variations and modifications may be effected without departing from the true spirit and scope of the novel concepts of the invention.

What is claimed is:

1. A method of treating an oil or gas well having a wellbore, well casing, production equipment or recovery equipment which comprises introducing into the wellbore, well casing, production equipment or recovery equipment a microemulsion having a discontinuous phase of a blend of a $C_1$-$C_4$ ester of a $C_{16}$-$C_{20}$ fatty acid and an emulsifier.

2. The method of claim 1, wherein the microemulsion further comprises a surfactant.

3. The method of claim 2, wherein the surfactant is nonionic.

4. The method of claim 3, wherein the weight percent of the nonionic surfactant based on the total weight of $C_1$-$C_4$ ester of a $C_{16}$-$C_{20}$ fatty acid and surfactant is between from about 1 to about 8 percent.

5. The method of claim 3, wherein the nonionic surfactant is selected from the group consisting of octylphenol polyethylene oxide ethers, nonylphenol polyethylene oxide ethers, linear alcohol polyethylene oxide ethers and sorbitan monooleate polyethylene oxide ethers.

6. The method of claim 1, wherein the fatty acid of the ester of the $C_{16}$-$C_{20}$ fatty acid is an oil selected from the group consisting of corn, mustard, niger seed, olive, peanut, poppy seed, rapeseed, safflower, sesame, soybean, sunflower seed and wheat germ.

7. The method of claim 1, wherein the $C_1$-$C_4$ ester of a $C_{16}$-$C_{20}$ fatty acid is a $C_{16}$-$C_{20}$ fatty acid methyl ester.

8. The method of claim 7, wherein the $C_1$-$C_4$ ester of a $C_{16}$-$C_{20}$ fatty acid is soybean methyl ester.

9. The method of claim 1, wherein the method comprises introducing the microemulsion into an oil or gas producing well penetrating a geological formation and stimulating the formation.

10. The method of claim 9, wherein the microemulsion further comprises a proppant.

11. method of claim 1, wherein, subsequent to introduction of the microemulsion into the wellbore, well casing, production equipment or recovery equipment, unwanted deposits are removed therefrom.

12. The method of claim 11, wherein the unwanted deposits removed from the wellbore, well casing, production equipment or recovery equipment are selected from the group consisting of asphaltenes, hydrogen sulfide, paraffins, scales, fines, sulfur, heavy oil by-products, water blocks, drilling fluids, cement filtrates, kill fluids, pipe dope, hydrocarbon emulsions, oil based muds and/or synthetic oil based muds.

13. The method of claim 11, wherein the microemulsion is introduced into the wellbore, well casing, production equipment or recovery equipment through production or coiled tubing.

14. The method of claim 1, wherein the microemulsion is introduced into the wellbore, well casing, production equipment or recovery equipment and drilling muds are removed therefrom and further wherein the drilling muds are removed prior to cementing of the wellbore or prior to introduction of a completion brine into the wellbore.

15. The method of claim 14, wherein the drilling muds are selected from the group consisting of oil based muds and synthetic oil based muds.

16. The method of claim 1, wherein the microemulsion is introduced into the wellbore, well casing, production equipment or recovery equipment which contains a well treating gelled fluid and further wherein the microemulsion, acting as a breaker catalyst, activates a gel breaker which is present in the wellbore, well casing, production equipment or recovery equipment thereby reducing the viscosity of the well treating gelled fluid.

17. The method of claim 1, wherein the microemulsion is a displacement spacer or a spearhead fluid.

18. A method of removing pipe dope, hydrocarbons, drilling muds, hydrogen sulfide, scales, fines, sulfur, heaving oil by-products, water blocks, cement filtrates, kill fluids, paraffins and/or asphaltenes from surface equipment or downhole equipment which comprises introducing onto the surface of the surface equipment or downhole equipment a microemulsion having a discontinuous phase of a blend of a $C_1$-$C_4$ ester of a $C_{16}$-$C_{20}$ fatty acid and an emulsifier.

19. The method of claim 18, wherein the fatty acid of the ester of the $C_{16}$-$C_{20}$ fatty acid is an oil selected from the group consisting of corn, mustard, niger seed, olive, peanut, poppy seed, rapeseed, safflower, sesame, soybean, sunflower seed and wheat germ.

20. The method of claim 18, wherein the microemulsion further comprises a surfactant.

21. The method of claim 18, wherein the $C_1$-$C_4$ ester of a $C_{16}$-$C_{20}$ fatty acid is a $C_{16}$-$C_{20}$ fatty acid methyl ester.

\* \* \* \* \*